(12) United States Patent
Brown et al.

(10) Patent No.: US 10,847,834 B1
(45) Date of Patent: Nov. 24, 2020

(54) CORROSION RESISTANT CURRENT COLLECTOR FOR LITHIUM METAL ANODE

(71) Applicant: Apple Inc., Cupertino, CA (US)

(72) Inventors: Karl M. Brown, Los Gatos, CA (US); Alan A. Ritchie, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 16/059,609

(22) Filed: Aug. 9, 2018

Related U.S. Application Data

(60) Provisional application No. 62/563,792, filed on Sep. 27, 2017.

(51) Int. Cl.
| | |
|---|---|
| *H01M 4/00* | (2006.01) |
| *H01M 10/0525* | (2010.01) |
| *H01M 10/052* | (2010.01) |
| *H01M 4/66* | (2006.01) |
| *H01M 4/62* | (2006.01) |
| *H01M 4/02* | (2006.01) |

(52) U.S. Cl.
CPC ......... *H01M 10/052* (2013.01); *H01M 4/628* (2013.01); *H01M 4/661* (2013.01); *H01M 2004/021* (2013.01); *H01M 2004/027* (2013.01); *H01M 2004/028* (2013.01)

(58) Field of Classification Search
CPC .... H01M 10/052; H01M 4/628; H01M 4/661; H01M 2004/027; H01M 2004/028; H01M 2004/021
See application file for complete search history.

(56) References Cited

U.S. PATENT DOCUMENTS

| | | | | |
|---|---|---|---|---|
| 5,705,297 A | * | 1/1998 | Warren | H01M 2/20 29/623.4 |
| 6,159,635 A | * | 12/2000 | Dasgupta | H01M 4/667 429/216 |
| 8,563,166 B2 | * | 10/2013 | Onodera | H01G 9/016 429/179 |
| 2004/0072066 A1 | | 4/2004 | Cho et al. | |
| 2009/0246637 A1 | * | 10/2009 | Taniguchi | H01M 10/0413 429/246 |
| 2015/0171398 A1 | * | 6/2015 | Roumi | G01R 31/3828 429/7 |
| 2016/0293943 A1 | | 10/2016 | Hu et al. | |
| 2017/0062830 A1 | | 3/2017 | Bao et al. | |
| 2017/0062832 A1 | | 3/2017 | Bucur et al. | |

* cited by examiner

*Primary Examiner* — Lisa S Park
(74) *Attorney, Agent, or Firm* — Young Basile Hanlon & MacFarlane, P.C.

(57) ABSTRACT

An anode for a lithium metal battery has a current collector formed of a flexible polymer substrate having an anode-facing surface, the polymer substrate formed of a polymer chemically compatible with lithium metal. A current pathway of a first conductive metal is embedded in the polymer substrate and has a terminal end extending from an end of the polymer substrate. Traces of a second conductive metal each have a current collecting portion at the anode-facing surface, the traces in electrical communication with the current pathway. Lithium metal is deposited onto the current collector.

20 Claims, 4 Drawing Sheets

US 10,847,834 B1

CORROSION RESISTANT CURRENT COLLECTOR FOR LITHIUM METAL ANODE

CROSS-REFERENCE TO RELATED APPLICATIONS

This application claims the benefit of U.S. Provisional Application No. 62/563,792, filed on Sep. 27, 2017, the content of which is hereby incorporated by reference in its entirety for all purposes.

TECHNICAL FIELD

This application generally relates to a corrosion resistant current collector for lithium metal anodes in high energy density batteries.

BACKGROUND

Lithium metal can provide significant increases in energy density, but can be difficult to handle and integrate. Lithium is soft and is typically used with a copper foil backing to mechanically support the lithium and provide a means to conduct current from the cell. However, when two dissimilar metals such as lithium and copper are placed into electrical contact in the presence of an electrolyte, galvanic corrosion will occur.

SUMMARY

The disclosed embodiments provide an anode having a current collector for a lithium metal battery comprising a flexible polymer substrate having an anode-facing surface, the polymer substrate formed of a polymer chemically compatible with lithium metal. A current pathway of a first conductive metal is embedded in the polymer substrate and has a terminal end extending from an end of the polymer substrate. Traces of a second conductive metal each have a current collecting portion at the anode-facing surface, the traces in electrical communication with the current pathway.

In some embodiments, a total area of current collecting portions is 20% or less than an area of the anode-facing surface.

In some embodiments, the current collecting portion is a contact point, and contact points are evenly distributed across the anode-facing surface.

In some embodiments, each contact point has a diameter between about 20 microns and about 1.0 mm.

In some embodiments, the first conductive metal and the second conductive metal are both copper.

In some embodiments, the current pathway is one or more copper strips.

In some embodiments, the current pathway is formed of the traces extending through the polymer substrate to the terminal end.

In some embodiments, the first conductive metal is copper and the second conductive metal is nickel.

In some embodiments, each current collecting portion is coated with a conductive corrosion barrier material.

In some embodiments, the corrosion barrier material is carbon.

In some embodiments, the corrosion barrier material is aluminum nitride.

In some embodiments, the current collector has a thickness of between 5 microns and 10 microns.

In some embodiments, the polymer of the polymer substrate is one or more of polyether ether ketone, polyimide, polyamide, polyethylene, polyvinyl acetate and polypropylene.

Also disclosed herein are anodes for a lithium metal battery comprising a current collector, a flexible polymer substrate having a first anode-facing surface and a second anode-facing surface opposite the first anode-facing surface, the polymer substrate formed of a polymer chemically compatible with lithium metal, a current pathway of a first conductive metal embedded in the polymer substrate and having a terminal end extending from an end of the polymer substrate and traces of a second conductive metal each having a current collecting portion at one of the first anode-facing surface and the second anode-facing surface, the traces in electrical communication with the current pathway. Lithium metal is deposited onto the first anode-facing surface, the second anode-facing surface, and current collecting portions of the current collector.

In some embodiments, an adhesion promotor is between the lithium metal and the current collector.

In some embodiments, the adhesion promotor is aluminum oxide.

In some embodiments, the adhesion promotor is a plasma treatment of the flexible polymer substrate.

Also disclosed herein are lithium metal batteries having a cathode comprising a cathode active material and a cathode current collector; a liquid electrolyte; an anode current collector comprising a flexible polymer substrate having an anode-facing surface, the polymer substrate formed of a polymer chemically compatible with lithium metal, a current pathway of a first conductive metal embedded in the polymer substrate and having a terminal end extending from an end of the polymer substrate and traces of a second conductive metal each having a current collecting portion at the anode-facing surface, the traces in electrical communication with the current pathway; and an anode comprising lithium metal deposited onto the anode-facing surface and current collecting portions of the anode current collector.

Another aspect of the disclosed embodiments is a battery pack having a plurality of lithium metal batteries.

DETAILED DESCRIPTION

When two dissimilar metals are placed into electrical contact in the presence of an electrolyte, galvanic corrosion will occur. In some high-energy density batteries, a lithium metal anode material is used with a copper current collector. Lithium has a galvanic potential of approximately −3.0 V and copper has a galvanic potential of approximately +0.8 V, so anodic corrosion of the lithium is expected. When a lithium metal layer on copper is used as the anode in a lithium metal battery, the galvanic corrosion initially begins at the edges where there are exposed lithium-copper junctions. The electrolyte can also penetrate the lithium grain boundaries, causing lithium corrosion at these boundaries. Eventually, the lithium will become porous and delaminate from the copper where the galvanic corrosion occurs. Obvious prevention measures would include removing the electrical connection, avoiding dissimilar metals or removing the electrolyte from the junction between the metals, none of which are possible in a battery.

The current collectors disclosed herein provide electrical contacts at discrete spots that are isolated from the liquid electrolyte that fills the cell. In this way, junctions of dissimilar metals that are exposed to electrolyte are significantly reduced, reducing the potential for galvanic corrosion in the anode, and thereby improving battery performance.

Figure 1A:
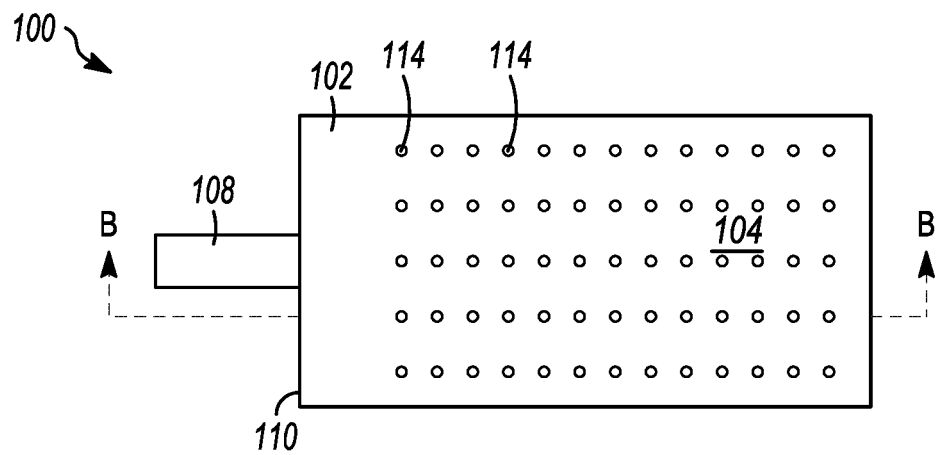
FIG. 1A is a plan view of an embodiment of a current collector as disclosed herein.
Figure 1B:
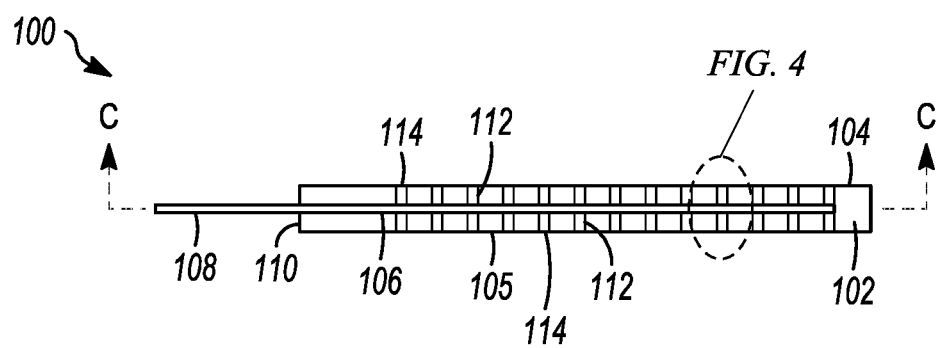
FIG. 1B is a cross-sectional view of the current collector of FIG. 1A along line B.
Figure 1C:
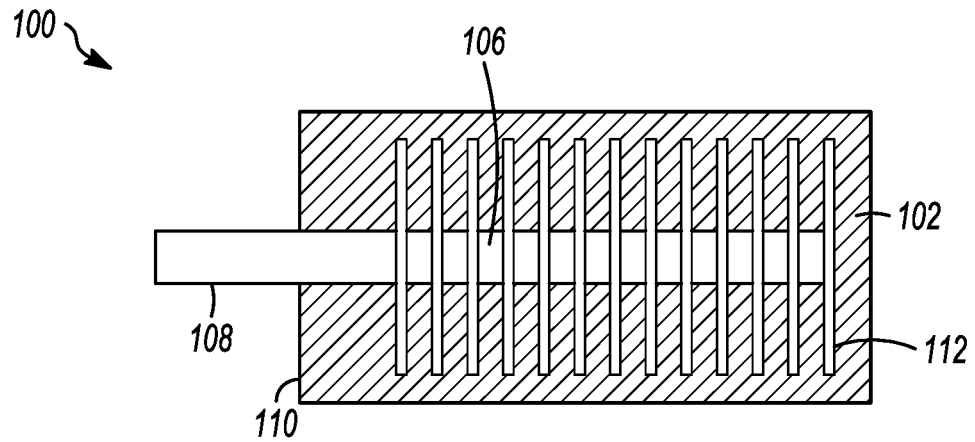
FIG. 1C is a plan cross-sectional view of the current collector of FIG. 1B along line C.

FIGS. 1A-1C illustrate an embodiment of a current collector 100 for a lithium metal battery as disclosed herein. The current collector 100 is formed of a flexible polymer substrate 102 having an anode-facing surface 104. A current pathway 106 is embedded in the polymer substrate 102 and has a terminal end 108 extending from an end 110 of the polymer substrate 102. Traces 112 or vias in electrical communication with the current pathway 106 each have a current collecting portion 114 at the anode-facing surface 104.

The current collectors disclosed herein are shown as double-sided, as seen in the side cross-sectional views. Each current collector has a second anode-facing surface 105 on its opposing side with traces 112 or vias in electrical communication with the current pathway 106. The traces 112 on the opposing side of the current pathway 106 will have respective current collecting portions 114 at the second anode-facing surface 105. Plan views of only one surface are included as the opposing surface will be similar or identical. Single-sided current collectors are contemplated herein. In other words, the traces 112 can be in electrical communication with the current pathway 106 on only one side of the current collector 100.

The polymer substrate 102 is formed of a polymer chemically compatible with lithium metal. As used herein "chemically compatible" means that the polymer is non-reactive with lithium metal. Non-limiting examples include polyether ether ketone, polyimide, polyamide, polyethylene, polyvinyl acetate and polypropylene. The polymer substrate 102 can provide mechanical strength to the lithium metal anode material.

Figure 2A:
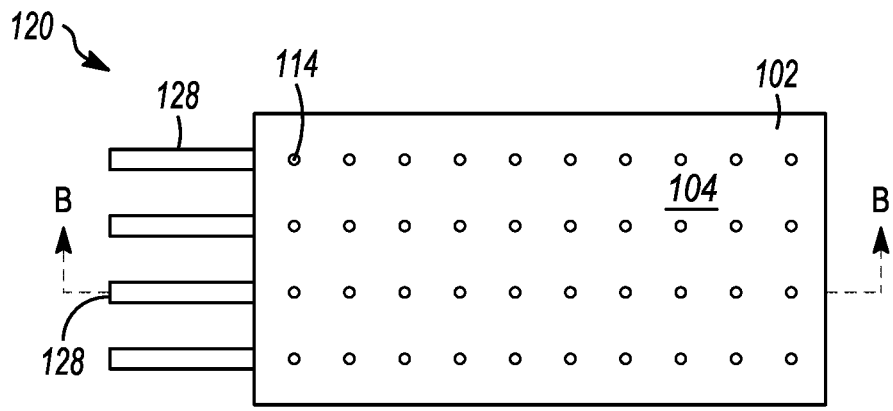
FIG. 2A is a plan view of another embodiment of a current collector as disclosed herein.
Figure 2B:
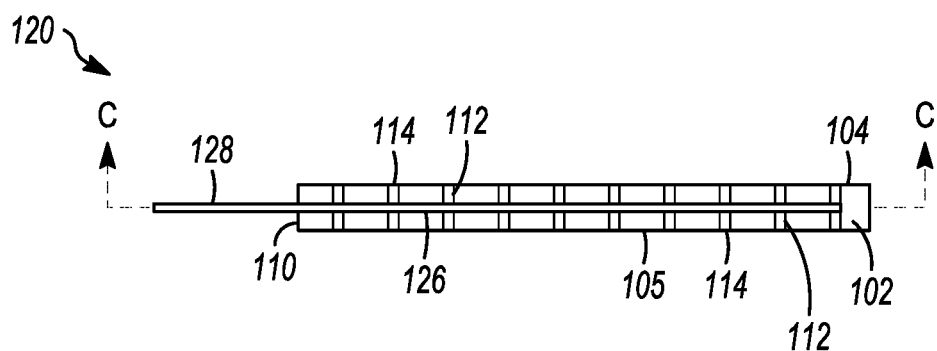
FIG. 2B is a cross-sectional view of the current collector of FIG. 2A along line B.
Figure 2C:
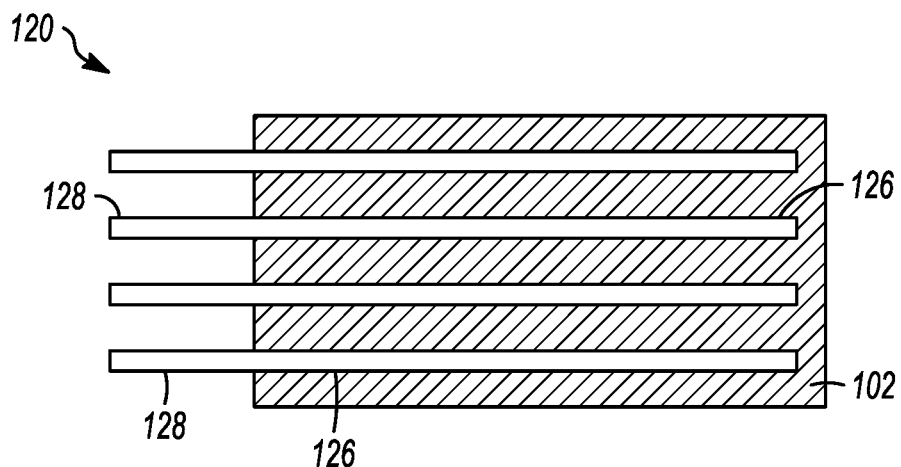
FIG. 2C is a plan cross-sectional view of the current collector of FIG. 2B along line C.
Figure 3A:
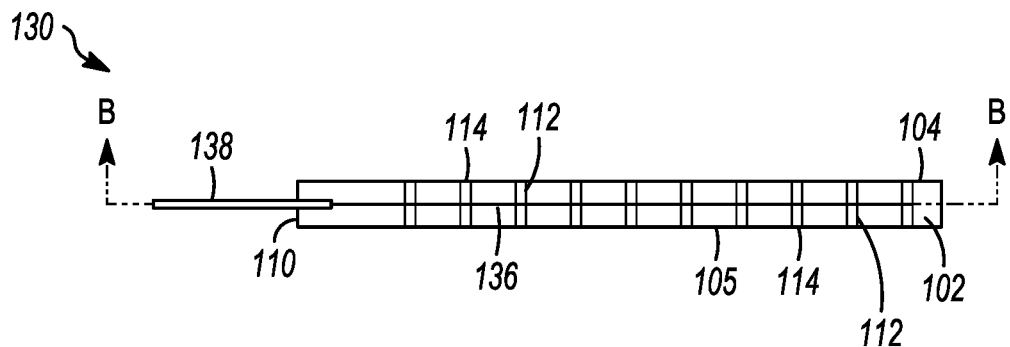
FIG. 3A is a cross-sectional view of another embodiment of a current collector as disclosed herein.
Figure 3B:
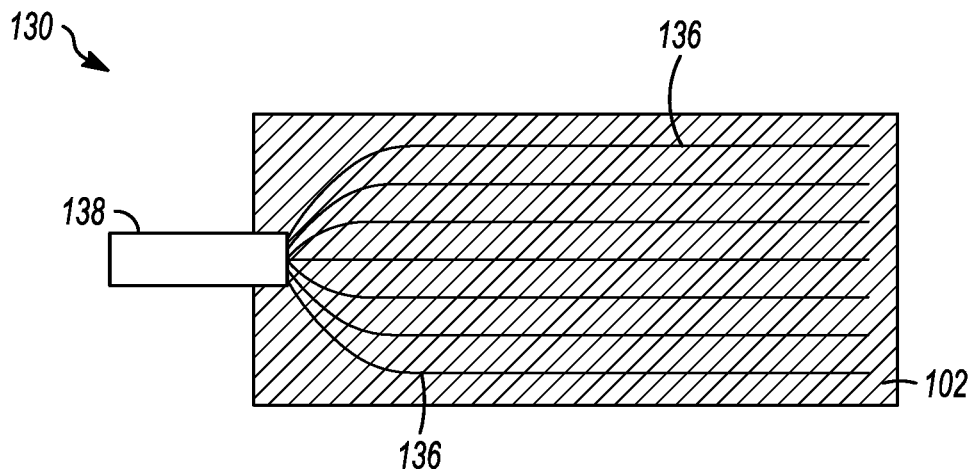
FIG. 3B is a plan cross-sectional view of the current collector of FIG. 3A along line B.

The current pathway 106 is a conductive metal that is embedded or encapsulated in the polymer substrate 102. The current pathway 106 is not limited in its structure. The current pathway 106 can be a single strip or wire of the conductive metal of a size sufficient to electronically communicate with the traces 112, as illustrated in FIGS. 1A-1C. The current pathway 106 conducts current from traces 112 through the terminal end 108. As another non-limiting example, the current collector 120 in FIGS. 2A-2C has a current pathway 126 of multiple strips or wires of the conductive metal, each in electrical communication with a respective portion of traces 112 and each carrying current through its respective terminal end 128. As another non-limiting example, the current collector 130 in FIGS. 3A and 3B has a current pathway 136 that are extensions of each trace 112, the trace 112 extending from the current collecting portion 114 (as illustrated in FIG. 1B) through the polymer substrate 102 and to terminal end 138, which conducts the current from the cell. As another non-limiting example, the current pathway 106 can be a sheet of conductive metal. Each of the examples of the current pathway 106 provides a current pathway 106 that is fully encased in the polymer substrate 102 apart from the terminal end 108.

The traces 112 are a conductive metal. The traces 112 and the current pathway 106 can be the same conductive metal. For example, the traces 112 and the current pathway 106 can both be copper or both be nickel. The traces 112 can be a different conductive metal than the conductive metal of the current pathway 106. For example, the current pathway 106 can be copper while the traces 112 can be nickel. Nickel is less reactive with lithium in the presence of the electrolyte. Copper and nickel are non-limiting examples of conductive metals that can be used as each of the current pathway 106 and traces 112. Nickel coated copper and other materials such as gold can also be used. FIG. 1C is a plan cross-sectional view along line C in FIG. 1A illustrating how the traces 112 communicate with the current pathway 106. In an embodiment, the entire trace 112 can be nickel. In another embodiment, a distal portion of the trace 112 that is perpendicular to the anode-facing surface 104 can be nickel, i.e., a plug of nickel, with the remainder of the trace 112 connecting the plug to the current pathway 106.

The traces 112 provide current collecting portions 114 that are discrete spots isolated from the liquid electrolyte that fills the cell. As illustrated in FIG. 1B, the current collecting portions 114 are contact points, such as distal ends, of the traces 112 that are exposed through the anode-facing surface 104 of the polymer substrate 102. As illustrated, these contact points are evenly distributed across the anode-facing surface 104. The distribution shown in the figures is illustrative only and not meant to be limiting. Each contact point can have a diameter between about 20 microns and about 1.0 mm. The smaller the current collecting portion 114 of each trace 112, the less likely the current collecting portion 114 will be exposed to the electrolyte in the cell. Having current collecting portions 114 of reduced size and increased number allows for isolated incidents of galvanic corrosion where the lithium metal is penetrated to the current collector by the electrolyte. The corrosion will occur at the discrete current collecting portion 114 but will not spread to other current collecting portions 114 due to the intervening polymer of the polymer substrate 102.

The number and size of collecting portions 114 provides sufficient contact with the lithium metal to conduct the current required during operation. To ensure sufficient current collection and reduce potential sites for corrosion, a total area of the current collecting portions 114 can be 20% or less of an area of the anode-facing surface 104. For example, the current collecting portions 114 can total between about 15% and 20% of the area of the anode-facing surface 104.

The current collecting portions 114 of the traces 112 can have other configurations. For example, the current collecting portions 114 can be the traces 112 extending along the anode-facing surface 104 of the polymer substrate 102 and connecting with the terminal end 108 within the polymer substrate 102. Other patterns of traces 112 are contemplated.

Figure 4:
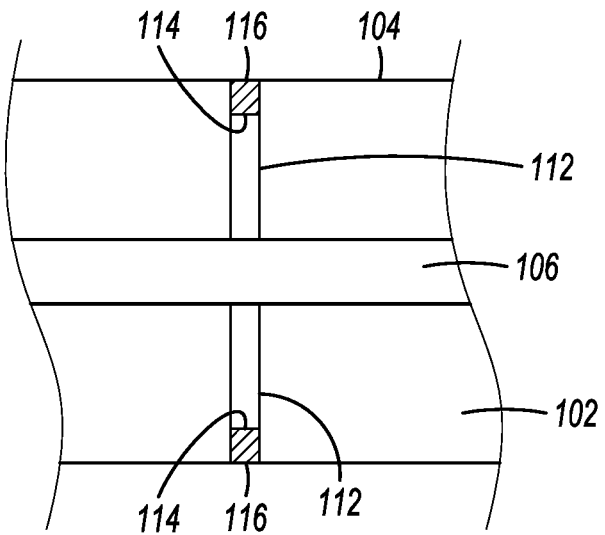
FIG. 4 is an enlarged view of the circled section of FIG. 1B.

FIG. 4 is an enlarged view of section 4 circled in FIG. 1B. As illustrated in FIG. 4, each current collecting portion 114 can be coated with a conductive corrosion barrier material 116 to further eliminate the potential for corrosion at the junction between the lithium, current collector metal and electrolyte. This barrier material 116 can be carbon or a material such as aluminum nitride, as non-limiting examples.

The current collector 100 can be manufactured by methods known to those skilled in the art. Processes can be either subtractive or additive. As a non-limiting example, metal foil can be used as the starting material and screen printed with the desired configuration. Material is removed based on the screen-printed design to form the current pathways 106 and/or traces 112. As another example, the current pathway 106 can be printed, plated or deposited onto a polymer film and covered with additional polymer to form the polymer substrate 102. Imprint lithography can be used to insert the traces 112 at the desired positions.

Figure 5:
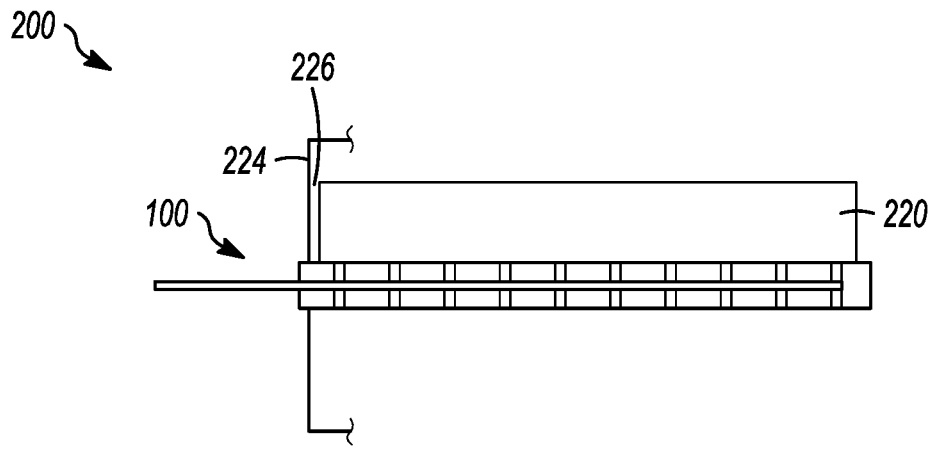
FIG. 5 is a cross-sectional view of an anode as disclosed herein.
Figure 6:
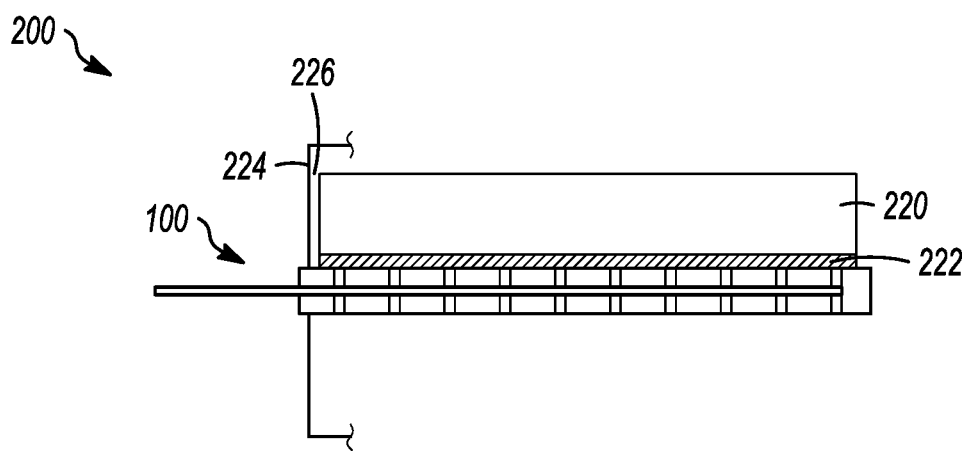
FIG. 6 is a cross-sectional view of another anode as disclosed herein.

An anode 200 for a lithium metal battery is illustrated in FIG. 5. The anode 200 comprises the current collector 100 disclosed herein with lithium metal 220 deposited onto both the anode-facing surface 104 and current collecting portions 114 of the current collector 100. A portion of encapsulation 224 is illustrated, with electrolyte 226 contained in the encapsulation 224. As illustrated, there are no junctions of dissimilar metals exposed to the electrolyte 226 in the anode 200 disclosed herein. FIG. 6 illustrates the anode 200 of FIG. 5 with an adhesion promotor 222 used between the lithium metal 220 and the current collector 100 to ensure adhesion of the lithium metal 220 on the polymer used for the polymer substrate 102. A non-limiting example of the adhesion promotor 222 is aluminum oxide. The anode-facing surface 104 of the polymer substrate 102 can also be plasma treated to improve the adhesion of the lithium metal 220 to the polymer substrate 102 of the current collector 100.

Figure 7:
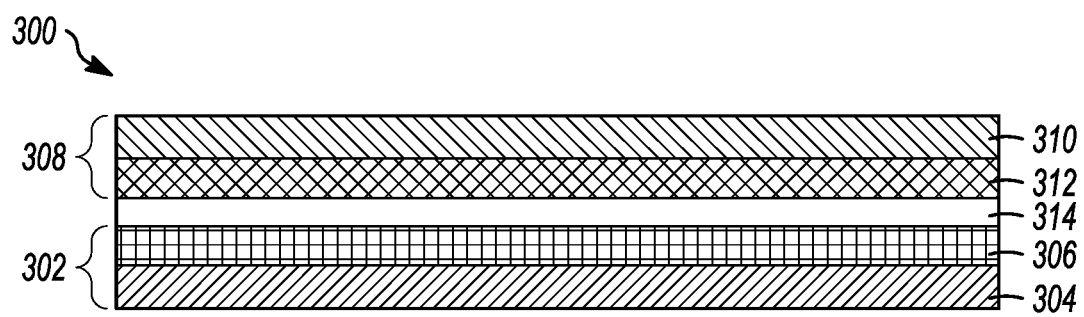
FIG. 7 is a cross-section view of a lithium metal battery as disclosed herein.

An aspect of the disclosed embodiments is a lithium metal battery 300, the layers of which are shown in cross-section in FIG. 7. The lithium metal battery 300 has an anode 302 as described herein with the current collector 304 representing disclosed current collector 100. The anode layer 306 represents the lithium metal layer 220. The lithium metal battery 300 also has a cathode 308 with a cathode current collector 310 and a cathode active material 312 disposed over the cathode current collector 310. The cathode 308 and the anode 302 are separated by electrolyte and a separator 314.

The cathode current collector 310 can be, for example, an aluminum sheet or foil. Cathode active materials 312 can include one or more lithium transition metal oxides which can be bonded together using binders and optionally conductive fillers such as carbon black. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$.

In some embodiments, the electrolyte may include a liquid electrolyte, a polymer ionic liquid, a gel electrolyte, or a combination thereof. The electrolyte can be an ionic liquid based electrolyte mixed with a lithium salt. The ionic liquid may be, for example, at least one selected from N-Propyl-N-methyl pyrrolidinium bis(fluorosulfonyl)imide, N-methyl-N-propylpyrrolidinium bis(trifluoromethanesulfonyl)imide, N-butyl-N-methylpyrrolidinium bis(trifluoromethylsulfonyl)imide, 1-butyl-3-methylimidazolium bis (trifluoromethylsulfonyl)imide, and 1-ethyl-3-methylimidazolium bis(trifluoromethylsulfonyl)imide. The salt can be or include, for example, a fluorosulfonyl (FS0) group, e.g., lithium bis(fluorosulfonyl)imide ($LiN(FS0_2)_2$, (LiFSI), $LiN(FS0_2)_2$, $LiN(FS0_2)(CF_3S0_2)$, $LiN(FS0_2)(C_2F_5S0_2)$. In some embodiments, the electrolyte is or includes a cyclic carbonate (e.g., ethylene carbonate (EC) or propylene carbonate, a cyclic ether such as tetrahydrofuran (THF) or tetrahydropyran (TH), a glyme such as dimethoxyethane (DME), dimethyl carbonate (DMC) or diethoxyethane (DEE), an ether such as diethylether (DEE) or methylbutylether (MBE), their derivatives, and any combinations and mixtures thereof.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art.

What is claimed is:

1. An anode for a lithium metal battery, comprising:
    a current collector comprising:
        a flexible polymer substrate having an anode-facing surface, the polymer substrate formed of a polymer chemically compatible with lithium metal;
        a current pathway of a first conductive metal embedded in the polymer substrate and having a terminal end extending from an end of the polymer substrate; and
        traces of a second conductive metal each having a current collecting portion, the traces in electrical communication with the current pathway, wherein the flexible polymer substrate has apertures through which respective current collecting portions are exposed at the anode-facing surface; and
    lithium metal deposited onto the anode-facing surface and current collecting portions of the current collector.

2. The anode of claim 1, further comprising an adhesion promotor between the lithium metal and the current collector.

3. The anode of claim 2, wherein the adhesion promotor is aluminum oxide.

4. The anode of claim 2, wherein the adhesion promotor is a plasma treatment of the flexible polymer substrate.

5. The anode of claim 1, wherein a total area of current collecting portions is 20% or less than an area of the anode-facing surface.

6. An anode for a lithium metal battery, comprising:
    a current collector comprising:
        a flexible polymer substrate having an anode-facing surface, the polymer substrate formed of a polymer chemically compatible with lithium metal;
        a current pathway of a first conductive metal embedded in the polymer substrate and having a terminal end extending from an end of the polymer substrate; and
        traces of a second conductive metal each having a current collecting portion at the anode-facing surface, the traces in electrical communication with the current pathway; and
    lithium metal deposited onto the anode-facing surface and current collecting portions of the current collector, wherein the current collecting portion is a contact point, and contact points are distributed across the anode-facing surface.

7. The anode of claim 6, wherein each contact point has a diameter between about 20 microns and about 1.0 mm.

8. The anode of claim 1, wherein the first conductive metal and the second conductive metal are both copper, and the traces form both current collecting portions and the current pathway.

9. The anode of claim 1, wherein the first conductive metal and the second conductive metal are both copper, and the current pathway is one or more copper strips.

10. The anode of claim 1, wherein the first conductive metal is copper and the second conductive metal is nickel.

11. The anode of claim 10, wherein the current pathway is one or more strips of copper.

12. The anode of claim 1, wherein each current collecting portion is coated with a conductive corrosion barrier material.

13. The anode of claim 12, wherein the corrosion barrier material is carbon.

14. The anode of claim 12, wherein the corrosion barrier material is aluminum nitride.

15. The anode of claim 1, wherein the current collector has a thickness of between 5 microns and 20 microns.

16. The anode of claim 1, wherein the polymer of the polymer substrate is one or more of polyether ether ketone, polyimide, polyamide, polyethylene, polyvinyl acetate and polypropylene.

17. A lithium metal battery, comprising:
  a cathode comprising a cathode active material and a cathode current collector;
  a liquid electrolyte;
  an anode current collector comprising:
    a flexible polymer substrate having an anode-facing surface, the polymer substrate formed of a polymer chemically compatible with lithium metal;
    a current pathway of a first conductive metal embedded in the polymer substrate and having a terminal end extending from an end of the polymer substrate; and
    traces of a second conductive metal each having a current collecting portion at the anode-facing surface, the traces in electrical communication with the current pathway; and
  an anode comprising lithium metal deposited onto the anode-facing surface and current collecting portions of the current collector.

18. An anode for a lithium metal battery, comprising:
  a current collector comprising:
    a flexible polymer substrate having a first anode-facing surface and a second anode-facing surface opposite the first anode-facing surface, the polymer substrate formed of a polymer chemically compatible with lithium metal;
    a current pathway of a first conductive metal embedded in the polymer substrate and having a terminal end extending from an end of the polymer substrate; and
    traces of a second conductive metal each having a current collecting portion at one of the first anode-facing surface and the second anode-facing surface, the traces in electrical communication with the current pathway; and
  lithium metal deposited onto the first anode-facing surface, the second anode-facing surface, and current collecting portions of the current collector, wherein the current collecting portion is a contact point, and contact points are distributed across each of the first anode-facing surface and the second anode-facing surface.

19. The anode of claim 18, wherein a total area of current collecting portions on each of the first anode-facing surface and the second anode-facing surface is 20% or less than an area of a respective anode-facing surface.

20. The anode of claim 18, wherein each contact point has a diameter between about 20 microns and about 1.0 mm.

* * * * *